United States Patent Office 2,772,175
Patented Nov. 27, 1956

2,772,175

STENCIL DUPLICATING INKS

Julian Lee Beatty, Northbrook, and Robert Thompson Florence, Park Ridge, Ill., assignors to A. B. Dick Company, Niles, Ill., a corporation of Illinois No Drawing. Application April 2, 1952,
Serial No. 280,206

6 Claims. (Cl. 106—26)

This invention relates to ink compositions for use in stencil duplication and it relates more particularly to water base stencil duplicating inks adapted to be used in rotary stencil duplicating machines or like duplicating processes wherein ink is fed from a reservoir to an ink pad for transfer through stencil openings to copy sheets.

It is desirable to compound a water base stencil duplicating ink of the type described with a bodying agent characterized by sufficient solubility in the aqueous medium to impart the desired viscosity to the ink composition without impairing the stability or the life thereof in storage or while in use in the machine, yet with sufficient resistance to attack by moisture to prevent deterioration or smear of the copy produced under high humidity or moisture conditions. This balance between complete solubility in the aqueous ink composition for good stability and shelf life and substantial insolubility upon drying has been difficult to achieve.

In the copending application of Robert Thompson Florence, filed on this same date, and entitled, "Stencil Duplicating Inks," description is made of a stencil duplicating ink composition of the water base type in which the bodying agent having an improved balance with respect to solubility in the aqueous composition and less solubility upon drying comprises a water soluble salt of a high molecular weight parent bodying agent, such as the ammonium, potassium or sodium salt of cellulose ethers or cellulose esters, proteins, polysaccharides, polyalkyl acrylates, styrenemaleic anhydride copolymers, caseinates, lignates, alginates or the like which become less soluble upon drying or substantially insoluble when the salt forming component comprises ammonium or other element which volatilizes off upon drying to leave the parent substance as a residue capable of functioning as an adherent protective base upon drying.

This invention comprises a still further improvement in a stencil duplicating ink of the water base type wherein use is made of a material for imparting the desired viscosity to the ink composition and insolubility upon drying comprising a complex water soluble double salt of a parent bodying agent selected from the group consisting of high molecular weight organic and resinous compounds of the type cellulose ethers and esters, synthetic and natural resins, polysaccharides, proteins and the like wherein one of the salt forming components comprises a metallic element including copper, nickel, cadmium, zinc, and iron while the other component comprises ammonium. The double ammonium metallic complex compounds of the type described are highly soluble in the aqueous medium of the ink composition in sufficient quantity to impart the desired viscosity and body thereto. While the ammonia is present the insolubility of the complex double salt remains substantially constant and provides for good shelf life and stability of the ink composition. On transfer of the ink composition through the stencil openings to the impression medium to form the copy, the ammonia component is removed by volatilization upon drying to leave the corresponding highly insoluble bivalent metal salt of the bodying agent.

Suitable bodying agents may be selected of such bivalent metal ammonium complex compounds of salt forming resinous materials, polysaccharides, proteins, natural resins and the like, such as zinc ammonium polyacrylate, copper ammonium methyl methacrylate, cadmium ammonium carboxy methyl cellulose, zinc, ammonium carboxy methyl cellulose, zinc ammonium caseinate, iron ammonium pectate and copper ammonium alginate, zinc ammonium alginate, or other ammonium complex double salts of alginates such as are described in the Ingham Patent No. 1,162,926 or the Stanford Patent No. 349,760.

The desired concentration of complex metal ammonium double salts of the bodying agent for imparting the desired viscosity to the ink composition and to impart the desired flow characteristics depends largely upon the character of the bodying agent and its molecular weight, the arrangement of constituent groups of which it is formed and the materials with which it is associated in the ink composition. It is convenient to refer to the amount of bodying agent capable of providing for a viscosity which has been found suitable for most water base stencil duplicating inks which conforms to a reading of 35–150 seconds when measured by a Stormer Viscosimeter under a 200 gram load at 20° C. with a cup having a center baffle and a thermometer well. It will be understood that under various conditions possible in stencil duplicating ink systems and conditions which might hereafter be developed which make viscosity requirements slightly different, the optimum viscosity range described above may change with corresponding changes in the amounts of bodying agent required in the ink composition.

By way of illustration, but not by way of limitation, the desired viscosity may be secured by the use of the double salts of cellulose ethers and esters in amounts ranging from 1–15 percent by weight in the ink composition or by the use of substantially corresponding amounts of the double ammonium salts of the polyalkyl acrylates. Less of the complex alginate salts are required, such for example as amounts within the range of 0.5–10 percent by weight.

As the tinctorial or coloring agent, use may be made of water soluble dyes, such as Nigrosine dyes or other water soluble dyes such as triphenylmethane, Rhodamine B, thioflavine, auramine dyes, sulfonated triphenylmethane, quinone-imide, and xanthane dyes. Representative of acid dyes which have been successfully used are such compounds as are marketed by the Calco Chemical Company under the trade name "Calcocids" which includes the mono-, di- and tri-, sodium sulfonate derivatives of nitro, azo, pyrazoline, quinoline, triphenylmethol, diphenylnaphthol, azine, xanthone and anthroquinone groups. Instead of dye compounds, dispersions of pigments may be used including such materials as lamp black, malachite green, iron blue, cadmium yellow and the like.

The amount of coloring agent embodied in the aqueous ink composition depends upon the chemical nature of the coloring material. With some dyes only small amounts are necessary to impart sufficient color to lend legibility to the copy. With others it is necessary to use higher concentrations. It has been found that dyes in amounts ranging from 3–10 percent are generally sufficient while higher ratios of pigments up to about 15 percent by weight are used in most instances.

The ability of the ink composition to dry rapidly on the copy sheet has been found to depend greatly upon the penetration of the ink composition into the impression paper upon contact and such penetration and correspondingly the rate of drying may be vastly increased by the use of suitable wetting agents in the ink composition. Wetting agents adapted to be used in stencil duplicating inks of the water base type may be selected from the group of materials consisting of dioctyl esters of sodium sulfosuccinate (Aerosol OT), quaternary ammonium compounds and their salts, fatty acid amines and their salts, triphenyl sodium disulfonates, sulfonated ethers, fatty alcohol sulfates such as sorbitan monolaurate, sorbitan monostearate and the like, alkyl aryl sulfonates, and polyoxyethylene derivatives of fatty acids such as sorbitan monolaurate or stearate polyoxyethylene derivative. Usually less than 2 percent by weight wetting agent is sufficient to impart the desired wetting out characteristics. Although more may be used, it is preferred to maintain the concentration of wetting agents in amounts less than 1 percent by weight.

Further improvements in ink compositions embodying the water soluble salts of high molecular weight compounds may be secured by the continued incorporation of humectants of the type which include the polyhydric alcohols, such as glycerine, ethylene glycol, diethylene glycol, triethylene glycol, polyethylene glycol, and the like or related substances and alkylol amines, such as diethanol amine, triethanol amine, n-formyl ethanol amine, monoethanol amine sulfamate, and the like. The humectants appear to minimize the tendency of the ink inadvertently to dry before transfer to the impression paper and they appear also to provide for a more flexible and adherent base after drying to form the imaging material on the impression paper. Such polyhydric alcohols or alkylol amines may be used to advantage in ink compositions of the type described when present in amounts ranging from 1–25 percent by weight. Amounts in excess of 40 percent by weight have in some instances been found to impart a degree of instability to the ink composition and it is undesirable to use humectants of the type described in amounts in excess of that by which the material is incapable of affecting the stability of the composition.

Where hydroxy or amino groups remain in the bodying agent in position capable of reaction with an aldehyde to form the corresponding acetal, insolubilization of the bodying agent may be further increased by the presence of such aldehydes selected to be incapable of reaction while in aqueous medium which function to insolubilize the bodying agent by acetal reaction upon drying. Latent reaction of the type described is found to exist in compounds such as glyoxal and pyruvic aldehyde present in amounts ranging from 5–20 percent by weight based upon the amount of bodying agent.

The following examples are illustrative of stencil duplicating ink compositions compounded in accordance with the practice of this invention:

Example 1

| | Percent |
|---|---|
| Nigrosine J (water soluble dye) | 5.0 |
| Wetting agent (dioctyl ester of sodium sulfosuccinate, 50% solution) | 2.0 |
| Glyoxal (30% solution) | 1.5 |
| Ethylene glycol | 35.0 |
| Zinc ammonium carboxy methyl cellulose (2.5% solution in water) | 56.5 |

Example 2

| | Percent |
|---|---|
| Nigrosine J (water soluble dye) | 5.0 |
| Wetting agent | 1.0 |
| Glyoxal (30% solution) | 1.5 |
| Ethylene glycol | 35.0 |
| Zinc ammonium polyacrylate (2.5 percent solution in water) | 57.5 |

Example 3

| | Percent |
|---|---|
| Aquablac (40% carbon black dispersed in aqueous medium) | 15.0 |
| Wetting agent | 1.0 |
| Ethylene glycol | 30.0 |
| Zinc ammonium alginate | 3.0 |
| Water | 51.0 |

Example 4

| | Percent |
|---|---|
| Carbon black in 40% aqueous dispersion | 15.0 |
| Wetting agent | 1.0 |
| Zinc ammonium carboxy methyl cellulose (2.5 percent solution) | 84.0 |

Example 5

| | Percent |
|---|---|
| Nigrosine J (water soluble dye) | 5.0 |
| Ethylene glycol | 25.0 |
| Copper ammonium caseinate | 14.0 |
| Water | 56.0 |

By the use of the described concepts in the manufacture of a new and improved stencil duplicating ink, a stable ink composition is formed having the desired viscosity for use in normal stencil duplicating operations and particularly for use in combination with an ink pad in conventional rotary stencil duplicating machines. Water base stencil duplicating inks of the type described and claimed herein have been found to dry at a speed which is beyond that heretofore contemplated for stencil duplicating inks and makes it possible to handle copy almost immediately without setoff or without the costly and cumbersome technique of slip-sheeting. It is possible to make use of water base stencil duplicating inks of the type described on hard stock or highly finished impression medium and still handle the copy almost immediately.

There are no materials present in ink compositions of the type described capable of causing undesirable show-through or halo. It will be evident that many other advantages result from the use of water base stencil duplicating inks including the impossibility of instability in the ink composition in storage or in use in the duplicating machine, simplification in the processes for cleaning the machine and stencil subsequent to use, and simplicity in ink manufacture because of the fact that the ink composition is in the form of a solution rather than as a dispersion or emulsion.

It will be apparent from this description that conversion of the complex compound to the corresponding bivalent metal salt during elimination of ammonia upon drying presents the bodying agent in an insoluble form which resists attack by water or in the presence of high humidity conditions to hasten drying and prevent smear or offset.

As used herein, the term "bodying agent capable of formation into water soluble complex metal ammonium salts" is meant to include such compounds as salt forming resinous materials, such as the polyacrylic acid derivatives, polysaccharides such as the algins, pectins and the like, proteins such as caseins, zein and the like, polyesters and natural resins such as rosin, shellac and the like.

It will be understood that various changes may be made in the details of formulation without departing from the spirit of the invention, especially as defined in the following claims.

We claim:

1. A stencil duplicating ink consisting essentially of water as the diluent, a tinctorial agent present in amounts within the range of 3–15% by weight of the ink composition and 0.5–15% by weight of a bodying agent for imparting the desired viscosity to the ink composition and for functioning as an adherent base upon drying consisting of a water soluble polyvalent metal ammonium colloid complex characterized by substantial insolubility upon release of the ammonium component upon drying and in which the colloid of which the complex is formed is selected from the group consisting of polysaccharides, proteins, natural resins, polyalkyl acrylates in which the alkyl group contains from 1–4 carbon atoms, cellulose ethers and cellulose esters.

2. A stencil duplicating ink as claimed in claim 1 in which the metallic component of the colloid complex is selected from the group consisting of copper, nickel, cadmium, zinc and iron.

3. A stencil duplicating ink as claimed in claim 1 which includes a liquid polyhydric alcohol present in an amount up to 40% by weight.

4. A stencil duplicating ink as claimed in claim 1 which includes a liquid polyhydric alcohol present in an amount up to 40% by weight and a wetting agent present in an amount up to 2% by weight of the ink composition.

5. A stencil duplicating ink as claimed in claim 1 which includes a water-soluble aldehyde ranging from 5–20% by weight of the bodying agent and selected from the group consisting of glyoxal and pyruvic aldehyde for reaction further to insolubilize the bodying agent upon drying.

6. A stencil duplicating ink as claimed in claim 1 which includes a liquid polyhydric alcohol present in an amount up to 40% by weight, a wetting agent present in an amount up to 2% by weight, and an aldehyde ranging from 5–20% by weight of the bodying agent and selected from the group consisting of glyoxal and pyruvic aldehyde for reaction further to insolubilize the bodying agent upon drying.

References Cited in the file of this patent

UNITED STATES PATENTS

| | | |
|---|---|---|
| 117,313 | McIlvaine | July 25, 1871 |
| 216,625 | Mendel | June 17, 1879 |
| 1,930,178 | Mizener | Oct. 10, 1933 |
| 2,090,630 | Iddings | Aug. 24, 1937 |
| 2,308,664 | Young et al. | Jan. 19, 1943 |
| 2,335,882 | Pinzarron | Dec. 7, 1943 |
| 2,340,946 | Ellis | Feb. 8, 1944 |
| 2,357,927 | Berg | Sept. 12, 1944 |
| 2,366,970 | Kroeger et al. | Jan. 9, 1945 |
| 2,414,858 | Davidson | Jan. 28, 1947 |
| 2,426,194 | Fischbach et al. | Aug. 26, 1947 |
| 2,441,101 | Matthews et al. | May 4, 1948 |
| 2,479,037 | Chambers et al. | Aug. 16, 1949 |
| 2,556,902 | Chambers et al. | June 12, 1951 |